Feb. 2, 1965 P. H. BEET 3,168,685
RECEIVERS FOR USE IN ELECTRIC SIGNALLING SYSTEMS
Filed April 3, 1962
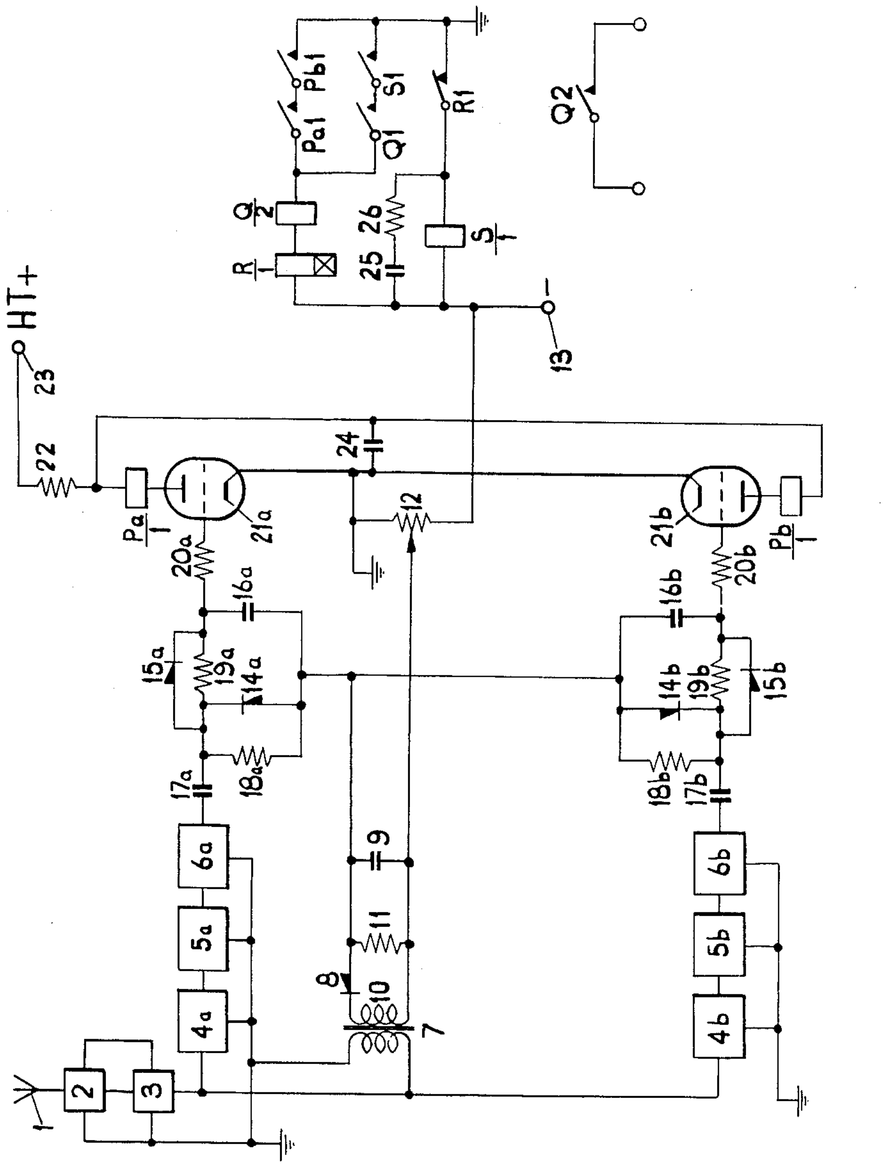
INVENTOR
PHILIP HOWARD BEET
BY
ATTORNEYS 3,168,685
RECEIVERS FOR USE IN ELECTRIC SIGNALLING SYSTEMS
Philip Howard Beet, Sheffield, England, assignor to The General Electric Company Limited, London, England
Filed Apr. 3, 1962, Ser. No. 184,817
Claims priority, application Great Britain, Apr. 7, 1961, 12,589/61
7 Claims. (Cl. 317—138)

This invention relates to receivers for use in electric signalling systems.

The invention relates particularly to receivers adapted to perform an operation in response to the reception of at least two substantially contemporaneous series of pulses of alternating current which is of a different frequency for each series. Such a form of signal may be used in order to provide a safeguard against false operation of the receiver.

It is an object of the present invention to provide such a receiver which incorporates further safeguards against false operation.

According to the invention, a receiver for use in an electric signalling system includes: first means responsive to the reception of a plurality of series of pulses of alternating current which is of a different specified frequency for each series, said first means being operative to provide a plurality of signals respectively corresponding to the different series of pulses, the magnitude of each signal increasing and decreasing relatively slowly in response respectively to the beginning and end of the revelant series of pulses; second means for performing an operation in response to the simultaneous occurrence of all the signals with magnitudes respectively exceeding predetermined levels; and third means for inhibiting the operation of the second means during the reception of a series of pulses of alternating current of any of the specified frequencies.

Preferably, said first means includes means for preventing the production of the signals in response to the reception of continuous waves of the specified frequencies.

The receiver may include further means for inhibiting the operation of said second means if the ratio of the magnitudes of the signals does not satisfy a predetermined relationship.

One arrangement in accordance with the invention will now be described with reference to the accompanying drawing which is a circuit diagram, partly shematic, of a receiver for use in a remote control system wherein the control signal is transmitted to the receiver by radio.

In this system the control signal is transmitted as amplitude modulations of a carrier wave and is in the form of pulses of audio frequency currents, of frequencies *fa* and *fb* respectively, transmitted alternately, the pulses of each frequency being of substantially equal magnitude. Each pulse has a duration of about 50 milliseconds and the total duration of the control signal is at least one second.

Referring to the drawing, it will be noticed that in certain parts of the receiver some elements are duplicated; for convenience, in such cases corresponding reference characters with respective suffixes "*a*" and "*b*" will be used for corresponding elements.

In the receiver, the control signal modulated on its carrier is fed from an aerial 1, via conventional amplifying circuits 2, to a conventional detector circuit 3, the output of which is fed to the inputs of two band pass filters 4*a* and 4*b*. An automatic gain control voltage is also derived from the detector 3, this voltage being applied to the amplifying circuits 2 so as to maintain the amplitude of the output of the detector 3 substantially constant despite variations in the magnitude of the received signal.

The filters 4*a* and 4*b* are arranged so that the filter 4*a* passes only signals having a frequency in the region of *fa* cycles per second and the filter 4*b* passes only signals having a frequency in the region of *fb* cycles per second; thus, the pulses of frequency *fa* cycles per second in the control signal appear only at the output of the filter 4*a* and the pulses of frequency *fb* cycles per second in the control signal appear only at the output of the filter 4*b*. The outputs of the filters 4*a* and 4*b* are respectively fed via cathode follower stages 5*a* and 5*b* to two further detector stages 6*a* and 6*b*, each of which is arranged to detect the envelope of the audio frequency signal applied to it; thus, at the outputs of the detectors 6*a* and 6*b* there appear respectively voltages of substantially rectangular waveform corresponding respectively to the envelopes of the pulses of frequencies *fa* and *fb* cycles per second in the control signal.

The output of the detector 3 is also fed via a transformer 7 to a half wave rectifying circuit incorporating a rectifier 8, the rectified voltage appearing across a capacitor 9 which is connected in series with the rectifier 8 between the ends of the secondary winding 10 of the transformer 7, the capacitor 9 being shunted by a resistor 11. The terminal of the capacitor 9 remote from the rectifier 8 is also connected to the tapping point on a potentiometer 12, the ends of the potentiometer 12 being respectively connected to earth and a terminal 13 which is maintained at a potential negative with respect to earth in operation.

The voltage appearing at the output of the detector 6*a* is rectified in an arrangement incorporating two rectifiers 14*a* and 15*a*, the rectified voltage appearing across a capacitor 16*a* between the terminals of which the rectifiers 14*a* and 15*a* are connected in series. The output of the detector 6*a* is applied to the junction between the rectifiers 14*a* and 15*a* via a capacitor 17*a* and the rectifiers 14*a* and 15*a* are respectively shunted by resistors 18*a* and 19*a*. The terminals of the capacitor 16*a* are further respectively connected to the junction between the rectifier 8 and the capacitor 9 and, via a resistor 20*a*, to the grid of a triode valve 21*a*.

The voltage appearing at the output of the detector 6*b* is similarly rectified in an arrangement comprising two rectifiers 14*b* and 15*b*, two capacitors 16*b* and 17*b* and two resistors 18*b* and 19*b* interconnected as described above. The rectified voltage is here developed across the capacitor 16*b* and the terminals of this capacitor 16*b* are further respectively connected to the junction between the rectifier 8 and the capacitor 9 and, via a resistor 20*b*, to the grid of a triode valve 21*b*.

The senses in which the rectifiers 8, 14*a*, 14*b*, 15*a* and 15*b* are connected will be apparent from the description given below of the operation of the receiver.

The cathodes of the valves 21*a* and 21*b* are connected to earth and the anodes of the valves 21*a* and 21*b* are respectively connected via the operating coils of two electromagnetic relays P*a* and P*b* to one end of a resistor 22 of high value whose other end is connected to a positive H.T. terminal 23. A capacitor 24 is connected between earth and the end of the resistor 22 remote from the terminal 23.

The relays P*a* and P*b* are each provided with a make-contact unit, the contacts P*a*1 and P*b*1 of which are connected in series between earth and one end of the operating coil of an electromagnetic relay Q, the other end of the operating coil of the relay Q being connected to the terminal 13 via the operating coil of a fourth electromagnetic relay R which is arranged to be slow to operate. The relay R is provided with a break-contact unit, the contacts R1 of which are connected in series with the operating coil of a fifth electromagnetic relay S between the terminal 13 and earth, the operating coil of the relay S being shunted by a capacitor 25 and a resistor 26 connected in series. The relays S and Q are each provided with a make-contact unit, the contacts Q1 and S1 of which are connected in series between earth and the end of the operating coil of the relay Q remote from the terminal 13. The relay Q is also provided with a second make contact unit, the operation controlled by the receiver being carried out when the contacts Q2 of this unit close.

In operation of the receiver, the voltage between the cathode and grid of each of the valves 21*a* and 21*b* is equal to the algebraic sum of the potential at the tapping point of the potentiometer 12, the rectified voltage (if any) developed across the capacitor 9 and the rectified voltage (if any) developed across the relevant one of the capacitors 16*a* and 16*b*. The magnitude of the potential at the tapping point of the potentiometer 12 is such that when no rectified voltages appear across the capacitors 9, 16*a* and 16*b*, that is in the absence of the control signal, both the valves 21*a* and 21*b* are in the cut-off condition. Thus, in the absence of the control signal only the relay S is energised.

When the control sigal is received, the rectified voltage developed across the capacitor 9 rapidly assumes its maximum value and this voltage drives the valves 21*a* and 21*b* further into the cut-off condition. During continued reception of the control signal, the rectified voltages developed respectively across the capacitors 16*a* and 16*b* gradually increase, reaching their maximum values after a period of about one second, these voltages respectively driving the valves 21*a* and 21*b* towards, but not actually into, the conducting condition.

When the control signal ceases, the capacitor 9 discharges relatively rapidly via the resistor 11, while the capacitors 16*a* and 16*b* discharge relatively slowly via the resistors 18*a*, 19*a* and 18*b*, 19*b*. The position of the tapping point on the potentiometer 12 is set so that, in the absence of the rectified voltage across the capacitor 9, the valves 21*a* and 21*b* are rendered conducting if the rectified voltages developed across the capacitors 16*a* and 16*b* are respectively equal to or greater than the voltages developed across these capacitors 16*a* and 16*b* after reception of the control signal continuously for half a second. Consequently, when the control signal ceases, the valves 21*a* and 21*b* are momentarily driven into the conducting condition if, as will normally be the case, the control signal has been received continuously for half a second or more. It will be appreciated that this arrangement provides a safeguard against false operation, since spurious signals similar to the control signal are unlikely to be received for a period as long as half a second.

When the valves 21*a* and 21*b* are driven into the conducting condition, the relays P*a* and P*b* are energised. The current for this is drawn from the capacitor 24, the charging current for the capacitor 24 being derived from the H.T. supply via the resistor 22 of which is high value so as to prevent energisation of the relays P*a* and P*b* directly from the H.T. supply.

As will be understood from the description below, in order for the operation controlled by the receiver to be carried out, the relays P*a* and P*b* must both be energised at the same time. For the relays P*a* and P*b* to be energised at the same time it is necessary, not merely that the valves 21*a* and 21*b* be conductive at the same time, but also that the valves 21*a* and 21*b* start to conduct at the same time. This is so for two reasons; firstly, because if one of the valves (say 21*a*) is rendered conductive appreciably before the other valve 21*b*, the capacitor 24 will have substantially completely discharged via the valve 21*a* and relay P*a* by the time valve 21*b* is rendered conductive; and secondly, if one of the valves (say 21*a*) is rendered conductive appreciably before the other, then this valve 21*a* may draw grid current which flows through the resistor 20*a*, the rectifiers 15*a* and 14*a*, the resistor 11 and part of the potentiometer 12 and so biases the grid of the valve 21*b* negatively thereby preventing the valve 21*b* from becoming conductive while the valve 21*a* is conductive.

It is thus a condition of operation of the receiver that the valves 21*a* and 21*b* be rendered conductive at substantially the same time. In order for this to be so the voltages across the capacitors 16*a* and 16*b* must be substantially equal when the capacitor 9 starts to discharge. Hence, the receiver will respond only if the signals of frequency *fa* and *fb* cycles per second are of substantially the same magnitude and both cease to be received at substantially the same time.

A further safeguard against false operation is thus provided since it is unlikely that spurious signals will satisfy this condition.

When the relays P*a* and P*b* are energised together the relays R and Q are energised by current supplied from the terminal 13; the contacts Q2 consequently close and the operation controlled by the receiver is carried out. To ensure execution of the operation, the relays R and Q remain energised via the contacts Q1 and S1 (the contacts S1 already being closed) for a short period after the relays P*a* and P*b* are de-energised, this period being dependent on the delay in the opening of the contacts R1 due to the relay R being slow to operate, and the delay in the de-energisation of the relay S after the contacts R1 have opened due to the presence of the capacitor 25. When the relay S eventually de-energises, the contacts S1 open allowing the relays Q and R to de-energise and the whole arrangement to return to its initial condition with the relay S energised via the contacts R1.

In addition to the safeguards against false operation mentioned above, the receiver also incorporates a further safeguard in that the presence of the capacitors 17*a* and 17*b* prevents operation of the receiver by the reception of two continuous tones of frequencies *fa* and *fb* cycles per second respectively. Such continuous tones produce steady D.C. voltages at the outputs of the detectors 6*a* and 6*b*; the capacitors 17*a* and 17*b* clearly prevent the further passage of these voltages through the receiver.

In other arrangements in accordance with the invention a receiver may be arranged to control a number of different operations, each operation being carried out in consequence of the reception of a different control signal. Such a receiver may suitably include, after the first detector circuit (corresponding to the circuit 3 in the arrangement described above), a separate channel for the pulses of each frequency in the control signals. At the output end of each such channel there may suitably be provided a separate relay (corresponding to the relays P in the receiver described above), the various operations controlled by the receiver being respectively carried out when different combinations of two or more of these relays are operated. In addition, in other arrangements in accordance with the invention the control signal for the or each operation controlled by the receiver may comprise more than two series of pulses of alternating currents of different frequencies.

It will further be appreciated that a receiver according to the invention may be arranged to operate indicating means as well as or instead of control means.

It will be understood that the control signal or signals for a receiver in accordance with the invention, instead of being transmitted to the receiver by radio as in the embodiment described above, may be transmitted in any other suitable way.

I claim:

1. A receiver for use in an electric signalling system, including: first means responsive to the reception of a plurality of series of pulses of alternating current which is of a different specified frequency for each series, said first means being operative to provide a plurality of signals respectively corresponding to the different series of pulses, the magnitude of each signal increasing and decreasing relatively slowly in response respectively to the beginning and end of the relevant series of pulses; second means for performing an operation in response to the simultaneous occurrence of all the signals with magnitudes respectively exceeding predetermined levels; and third means for inhibiting the operation of the second means during the reception of a series of pulses of alternating current of any of the specified frequencies.

2. A receiver according to claim 1, wherein said first means includes means for preventing the production of the signals in response to the reception of continuous waves of the specified frequencies.

3. A receiver according to claim 1, including further means for inhibiting the operation of said second means if the ratio of the magnitudes of the signals does not satisfy a predetermined relationship.

4. A receiver according to claim 1, wherein said first means comprises a plurality of channels each of which provides one of said signals and includes a filter which passes only alternating current signals having a frequency in the region of one of the specified frequencies, a detector for detecting the envelope of any alternating current signal passed by the filter, and a capacitor connected so as to be charged by the output of the detector.

5. A receiver according to claim 4, including in each of said channels means for applying the output of the detector via a coupling which does not pass direct current to a rectifying circuit, and means for applying the output of the rectifying circuit to charge said capacitor.

6. A receiver according to claim 4, wherein said second means comprises a plurality of electric valves, one corresponding to each of said channels, and a plurality of relays respectively connected to said plurality of valves so that each relay is operative when the corresponding valve is rendered conducting, said operation being performed when all the relays are operative simultaneously; wherein the capacitor in each of said channels is connected in an input circuit for the corresponding valve; and wherein said third means comprises a further capacitor which is connected in the input circuits for all the valves, and means for charging said further capacitor in response to the reception of an alternating current signal of any of the specified frequencies, the charging and discharging rates of the further capacitor being considerably greater than those of the capacitors in said channels, the polarity of the voltage appearing across each of the capacitors in said channels when it is charged being such as to tend to render the corresponding valve conducting, and the polarity of the voltage appearing across said further capacitor when it is charged being such as to tend to render all the valves non-conducting.

7. A receiver according to claim 6, wherein said valves and said relays are connected to a common capacitor in such a manner that upon one of the valves being rendered conducting a discharge current from the capacitor will flow so as to render the corresponding relay operative, and means are provided for supplying charging current to said common capacitor from a source whose impedance is such as to prevent any relay being rendered operative by current derived directly from said source.

References Cited by the Examiner

UNITED STATES PATENTS

| | | | |
|---|---|---|---|
| 2,457,730 | 12/48 | Roberts | 317—147 X |
| 2,500,212 | 3/50 | Starr | 317—147 X |
| 2,547,023 | 4/51 | Lense et al. | 317—138 X |
| 2,554,329 | 5/51 | Hammond | 317—138 X |
| 3,039,081 | 6/62 | Smith | 317—138 X |

SAMUEL BERNSTEIN, *Primary Examiner.*